United States Patent
Renaud et al.

(10) Patent No.: US 10,731,699 B2
(45) Date of Patent: Aug. 4, 2020

(54) PIVOT LINK ASSEMBLY

(71) Applicants: SAFRAN, Paris (FR); SAFRAN LANDING SYSTEMS, Velizy Villacoublay (FR)

(72) Inventors: Mathieu Renaud, Maisons-alfort (FR); Jean-Sébastien Charrier, Blagnac (FR); Rémi Grenêche, Blagnac (FR); Anne Mounier, Blagnac (FR); Aurélie Eléonore Pilato, Montigny-le-bretonneux (FR)

(73) Assignees: SAFRAN, Paris (FR); SAFRAN LANDING SYSTEMS, Velizy Villacoublay (FR)

( * ) Notice: Subject to any disclaimer, the term of this patent is extended or adjusted under 35 U.S.C. 154(b) by 483 days.

(21) Appl. No.: 15/429,764

(22) Filed: Feb. 10, 2017

(65) Prior Publication Data
US 2017/0152886 A1    Jun. 1, 2017

Related U.S. Application Data

(63) Continuation of application No. PCT/FR2015/052185, filed on Aug. 7, 2015.

(30) Foreign Application Priority Data

Aug. 13, 2014   (FR) ...................... 14 57799

(51) Int. Cl.
*F16C 11/04*    (2006.01)
*E02F 9/00*    (2006.01)

(52) U.S. Cl.
CPC ............ *F16C 11/045* (2013.01); *E02F 9/006* (2013.01); *F16C 2208/82* (2013.01); *F16C 2326/43* (2013.01); *Y10T 403/32926* (2015.01)

(58) Field of Classification Search
CPC ..... Y10T 403/32918; Y10T 403/32926; Y10T 403/32959; E02F 9/006; F16C 11/045; F16C 2208/82; F16C 2326/43
See application file for complete search history.

(56) References Cited

U.S. PATENT DOCUMENTS

| 3,124,370 | A | * | 3/1964 | Traugott | .................. | B60G 7/02 280/86.756 |
| 3,227,250 | A | * | 1/1966 | Cram | ...................... | E02F 9/006 403/291 |

(Continued)

FOREIGN PATENT DOCUMENTS

| CN | 202937612 | | 5/2013 |
| EP | 1911985 A1 | | 4/2008 |

(Continued)

OTHER PUBLICATIONS

Japanese Office Action in corresponding Japanese Application No. 2017-508550, dated Aug. 6, 2019 (8 pages).

*Primary Examiner* — Matthew R McMahon
(74) *Attorney, Agent, or Firm* — Bookoff McAndrews, PLLC (57) ABSTRACT

The invention relates to a pivot connection type assembly comprising a shaft and first and second connection parts, each receiving the shaft so as to enable them to pivot relative to each other, the first connection part being arranged axially between a first end of the shaft and a radial plane, while the second connection part is arranged axially between said radial plane and the other end of the shaft. The shaft is hollow and includes an inside section that presents a radial dimension at least in a first axial plane and over a first segment of the shaft extending axially between the first end and the radial plane, which radial dimension varies, decreasing on axially approaching the radial plane. The assembly includes a ring interposed radially between the shaft and a (Continued)

bore of the first connection part, and presenting radial thickness that varies.

12 Claims, 4 Drawing Sheets

(56) References Cited

U.S. PATENT DOCUMENTS

| | | | |
|---|---|---|---|
| 4,034,946 A * | 7/1977 | Zimmer, Jr. | F21V 21/30 248/183.2 |
| 4,582,229 A * | 4/1986 | Wolf | A01C 7/12 222/282 |
| 5,209,594 A * | 5/1993 | Svensson | F16C 11/02 403/11 |
| 5,320,443 A * | 6/1994 | Lien | E02F 9/006 403/154 |
| 5,628,577 A * | 5/1997 | Ribeiro | F02F 3/0069 403/150 |
| 5,718,518 A | 2/1998 | Ornberg | |
| 5,807,007 A * | 9/1998 | Stemper | F16C 11/02 403/13 |
| 7,329,066 B2 * | 2/2008 | Pineiros | B64D 27/26 403/150 |
| 7,753,612 B2 * | 7/2010 | Bouru | F16C 11/045 403/123 |
| 8,469,622 B2 * | 6/2013 | McClanahan | E02F 3/58 403/154 |
| 2003/0150140 A1 | 8/2003 | Takayama et al. | |
| 2007/0007386 A1 | 1/2007 | Coupe et al. | |

FOREIGN PATENT DOCUMENTS

| | | |
|---|---|---|
| JP | H05-501144 A | 3/1993 |
| JP | 2000-234614 A | 8/2000 |
| JP | 2007-045393 A | 2/2007 |
| JP | 2009-530169 A | 8/2009 |
| WO | 90/15262 A1 | 12/1990 |

* cited by examiner

__PIVOT LINK ASSEMBLY__

CROSS-REFERENCE TO RELATED APPLICATIONS

This application is a continuation of International Application No. PCT/FR2015/052185, filed on Aug. 7, 2015, which claims priority to French Patent Application No. 1457799, filed on Aug. 13, 2014.

FIELD OF THE INVENTION

The present disclosure relates to a pivot connection type assembly, enabling two connection parts to pivot relative to each other and intended in particular for incorporating in an aviation mechanism, in particular an airplane landing gear.

INTRODUCTION

In a known manner, a pivot connection type assembly may comprise a shaft and first and second connection parts that are dissociated from each other, each having a bore receiving the shaft so as to enable the first and second connection parts to pivot relative to each other, the first connection part being arranged axially between a first end of the shaft and a radial plane, while the second connection part is arranged axially between said radial plane and the other end of the shaft.

In aviation applications, and most particularly in airplane landing gear, the loads to which such assemblies are subjected can be large, such that early damage is often observed in the connection parts, in particular at the edges of the respective bores in the connection parts that are designed to receive the shaft, thus requiring maintenance, which can often be expensive.

Furthermore, in the field of aviation, the weight of any on-board structure has a direct impact on the performance of an aircraft, such that the designers of aviation structures need to take care at least to maintain an acceptable level of control over the weight of any such structure, and better, they need to attempt to reduce any such weight in order to improve the performance of the aircraft.

Consequently, there exists a need for developing a pivot connection type assembly that is provided with connection parts having bores with edges that are better at withstanding this damage phenomenon, while nevertheless keeping the weight of the assembly to a level that is acceptable.

SUMMARY OF THE INVENTION

An aspect of the present disclosure provides a pivot connection type assembly comprising a shaft and first and second connection parts that are dissociated from each other, each having a bore receiving the shaft so as to enable the first and second connection parts to pivot relative to each other, the first connection part being arranged axially between a first end of the shaft and a radial plane, while the second connection part is arranged axially between said radial plane and the other end of the shaft. In this assembly, the shaft is hollow and includes an inside section that presents a radial dimension at least in a first axial plane and over a first segment of the shaft extending axially between the first end and the radial plane, which radial dimension varies, decreasing on axially approaching the radial plane. The assembly includes a ring interposed radially between the shaft and the bore of the first connection part, and presenting radial thickness that varies.

Studies and modeling undertaken by the inventors have enabled them to find that the damage phenomenon is caused essentially by the magnitudes of the radial forces to which the shaft is subjected when loaded varying along the shaft (the cause from which the damage phenomenon originates), which forces can reach local maxima in the vicinity of the radial plane, thereby leading to a small amount of deformation in bending of the shaft, which in turn leads to a significant increase in local stress peaks, leading to local deformation of the edges of the bores in the connection parts (consequences of the damage phenomenon).

The idea of the inventors that is implemented in the assembly in the above-specified aspect of the present disclosure, is to act in combined manner both on the cause and on the consequences of this damage phenomenon, so that the means that are provided for acting on the cause can be underdimensioned and thus made lighter in weight because of the simultaneous presence of means provided for acting on the consequences, and vice versa. It is thus possible to combat the damage phenomenon effectively while sustaining minimal impact on the overall weight of the assembly.

In particular, the cause at the origin of the damage phenomenon can be addressed by varying a radial dimension of the inside section of the shaft, which variation occurs at least in a first axial plane, and specifically between the first end of the shaft and the radial plane in the vicinity of which the shaft, when loaded, is likely to be subjected to a local maximum of radial forces, this radial dimension decreasing on approaching the radial plane. Such variation in the radial dimension can thus enable the shaft to be reinforced locally against its bending deformation, while minimizing the weight of the shaft at its first end, which is less likely, when loaded, to be subjected to large radial forces, thereby compensating for the above-mentioned local reinforcement. As for the consequences, they are addressed by inserting a ring in the bore of the first connection part, which ring is of varying thickness, thereby enabling the edge of the bore to be reinforced locally. The combined action of the ring and of the varying radial dimension of the inside section of the shaft enables the damage phenomenon to be significantly reduced, while simultaneously enabling their respective sizes to be minimized as a result of both the ring and the varying dimension being present, thus making it possible to preserve an overall weight of the assembly that is acceptable.

In the present disclosure, the term "axial" is used to designate the axis defined by the shaft and around which the first and second connection parts can pivot relative to each other. Thus, the term "axial direction" designates any direction parallel to that axis, whereas the adverb "axially" is used in the present disclosure to mean "along an axial direction" (e.g., the first end and the other end of the shaft are spaced apart axially, i.e. they are spaced apart in the axial direction). Likewise, in the present disclosure, the term "axial plane" is used to designate a plane that contains the axis of the shaft.

Furthermore, in the present disclosure, the term "radial" is used to designate any direction perpendicular to and intersecting the axis of the shaft. Thus, the adverb "radially" means "perpendicularly intersecting" that axis, i.e. "in a radial direction". In addition, in the present disclosure, the term "radial plane" is used to mean any plane perpendicular to the axis. Furthermore, the terms "radial dimension" and "radial thickness" are used respectively to designate a dimension and a thickness that are projected onto a line intersecting the axis orthogonally.

In certain embodiments, the first and second connection parts can pivot through 180° relative to each other and define in this configuration the first axial plane. The radial forces transmitted to the shaft can be large in this configuration when the assembly is loaded.

In certain embodiments, the radial dimension that varies may decrease linearly on axially approaching the radial plane.

In certain embodiments, the inside section of the shaft may present a radial dimension that is constant in said at least one first axial plane and over a second segment of the shaft that is axially adjacent to the first segment. In particular, in at least said first axial plane, the radial dimension of the inside section may present a minimum value that is reached axially at a particular point of the first segment that is at a distance from the radial plane, which value is then conserved all along the second segment, thus making it possible to further reinforce the shaft in its zone that is the most highly stressed in bending.

In certain embodiments, the inside section of the shaft may be circular. It can be understood that the radial dimension characteristic of the inside section that applies in the first axial plane, also applies in any other axial plane. The shaft can thus be reinforced in a manner that is uniform around its circumferential direction, and its inside space can also be obtained easily by a conventional machining operation, in particular when the shaft is made of metal, which is nevertheless not essential in the context of the present disclosure.

In certain embodiments, the radial thickness of the ring may increase on axially approaching the radial plane, at least in the first axial plane. This shape for the ring makes it possible to minimize its weight, by thinning its thickness on going axially away from the radial plane, while locally reinforcing the portion of the edge of the bore that is the most likely to be subjected to the highest stresses when the shaft is subjected to bending deformation.

In certain embodiments, in a section plane parallel to the radial plane, the ring may present an inside circumference that is circular, for facilitating assembly of the ring on the shaft.

In certain embodiments, in said section plane, the ring may present an outside circumference that is circular, of diameter that decreases on passing from said section plane to another section plane further from the radial plane and parallel to the radial plane.

In certain embodiments, the ring may present symmetry of revolution. Therefore, the ring may be obtained using a conventional machining operation, in particular when the ring is made of metal, which is nevertheless not essential in the context of the present disclosure.

In certain embodiments, the radial thickness of the ring may be greater in the first axial plane than in a second axial plane orthogonal to the first axial plane, which can enable the weight of the ring to be lightened while reinforcing the edge of the bore in the axial plane where the stresses applied thereto are likely to be the greatest.

In certain embodiments, in a section plane parallel to the radial plane, the ring may present an inside circumference that is circular and an outside circumference that is not circular, the ring presenting a variation in radial thickness.

In certain embodiments, the outside circumference may be elliptical and present a major axis in the first axial plane and a minor axis in the second axial plane.

In certain embodiments, the first connection part and/or the second connection part may incorporate a composite material, e.g. a carbon/epoxy material.

In certain embodiments, the first connection part may incorporate a composite material, while the second connection part may be constituted by a metal material.

In certain embodiments, the second connection part may incorporate a composite material, while the first connection part may be constituted by a metal material.

Having recourse to composite materials is becoming widespread in the field of aviation, because of their low density and because of their good mechanical and fatigue strengths. Thus, using composite materials has the advantage of enabling the weight of a given part to be reduced, in comparison with using other materials that are more conventional, such as metals. Nevertheless, composite materials present the drawback of being more sensitive to damage phenomena, because of their intrinsic characteristics, which give composite materials their own specific modes of rupture, such as delamination (separation between adjacent plies). However, the assembly in accordance with the above-specified aspect of the present disclosure is specifically designed to withstand the damage phenomenon better. Under such circumstances, incorporating at least one composite material in the assembly is appropriate, insofar as it makes it possible to obtain the advantage of the additional saving in weight due to such material, while minimizing its drawback.

In certain embodiments, the assembly may include a clevis incorporating the first connection part and a third connection part spaced apart axially from the first connection part, and a complementary part incorporating the second connection part and interposed axially between the first and third connection parts of the clevis. Such an arrangement of the assembly can enable greater loads to be withstood, insofar as the loads can be shared over the two connection parts of the clevis.

In certain embodiments, the first and third connection parts may be symmetrical to each other about a plane of symmetry parallel to the radial plane, and the inside section of the shaft may be symmetrical relative to said plane of symmetry.

The above-mentioned characteristics and advantages, and others, appear better on reading the following detailed description of embodiments having no limiting character and that are proposed merely by way of illustration. The detailed description makes reference to the accompanying drawings.

BRIEF DESCRIPTION OF THE DRAWINGS

The accompanying drawings are diagrammatic and not to scale, seeking above all to illustrate the principles set out in the present disclosure. In the accompanying drawings.

DETAILED DESCRIPTION OF EMBODIMENTS

Figure 1:
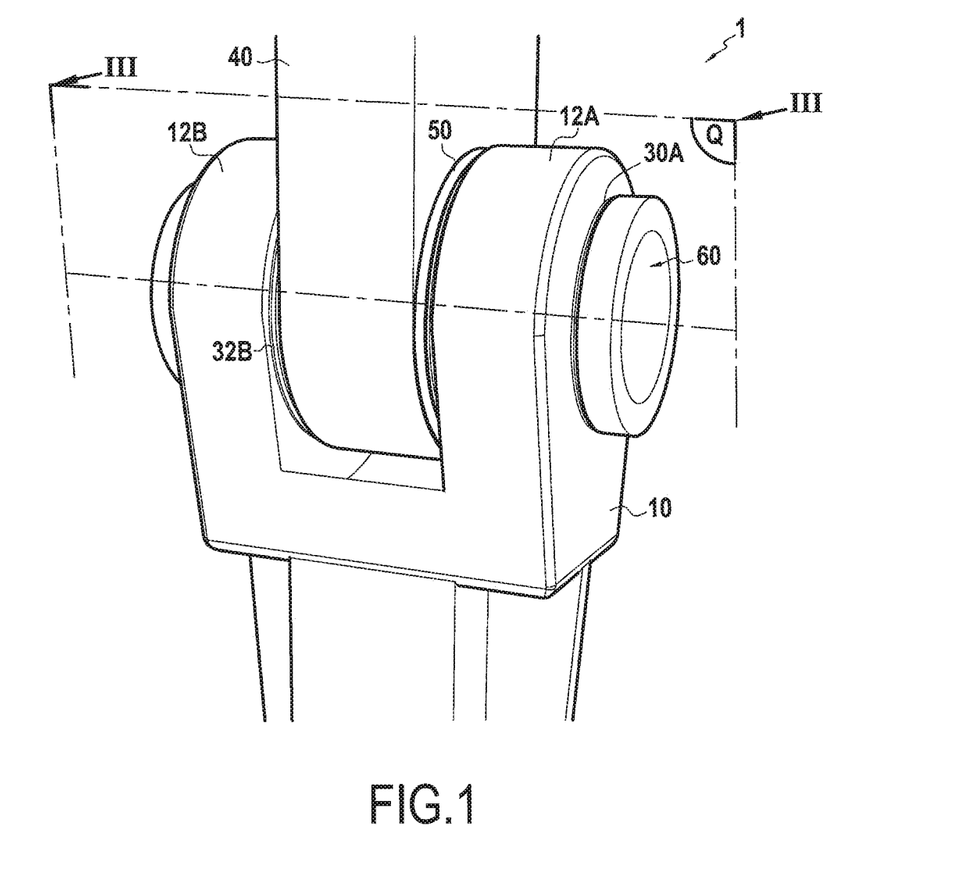
FIG. 1 is a perspective view of a pivot connection type assembly of a first embodiment in accordance with the present disclosure.
Figure 2:
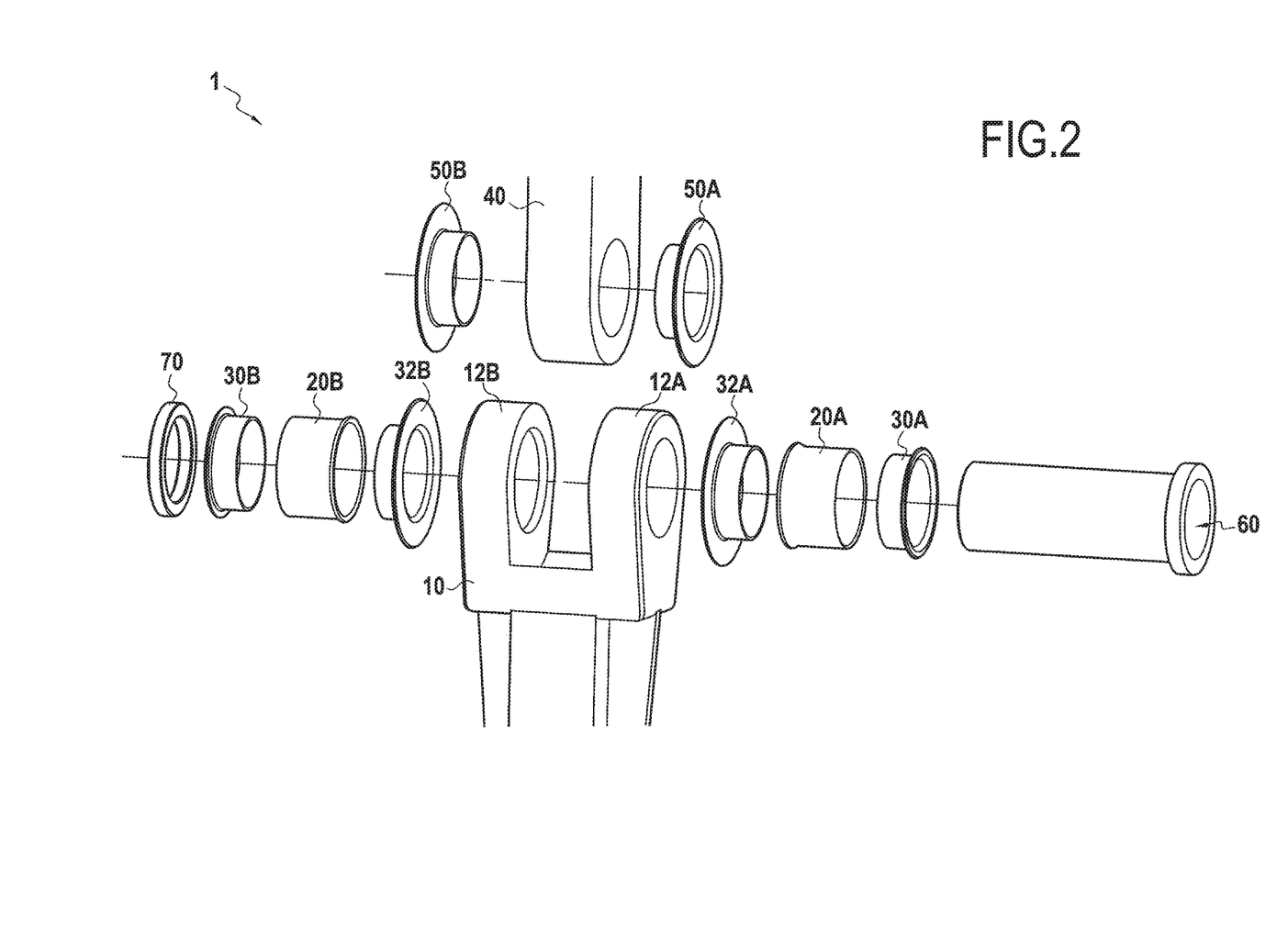
FIG. 2 is an exploded view of this assembly.
Figure 3:
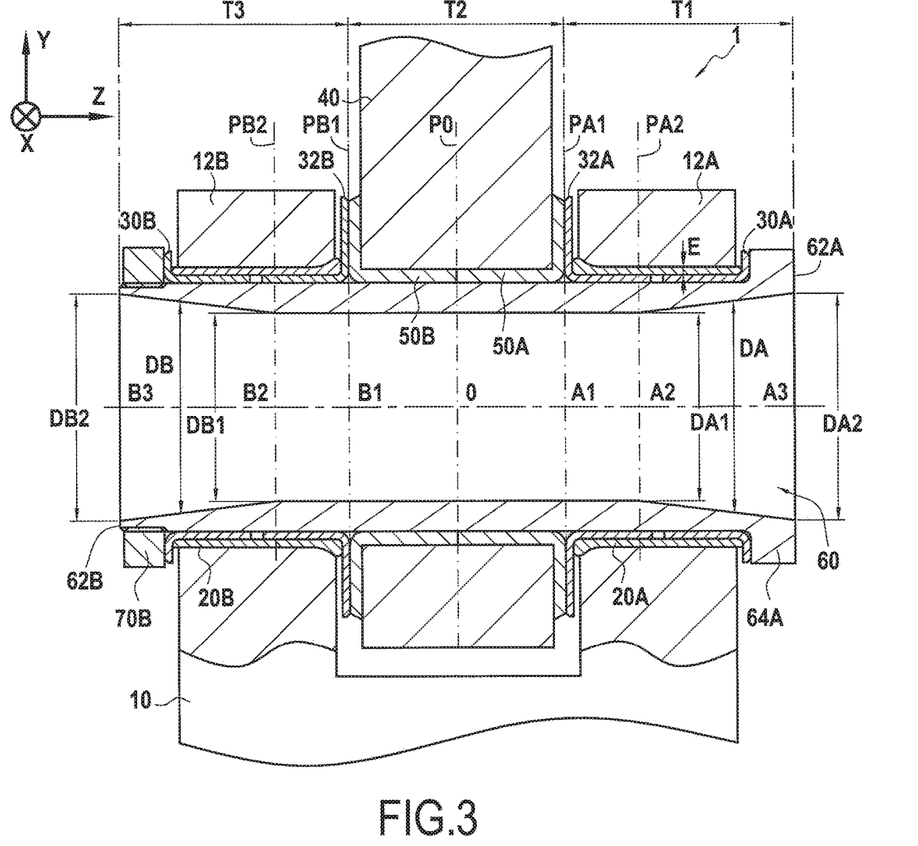
FIG. 3 is a section view of this assembly on axial plane Q shown in FIG. 1.

FIGS. 1 to 3 are diagrammatic views of a first embodiment of a pivot connection type assembly 1 in accordance with the present disclosure.

In this embodiment (see in particular FIG. 3), the assembly 1 comprises a shaft 60 and first and second connection parts 12A and 40 that are dissociated from each other, each having a bore for receiving the shaft 60 in order to enable the first and second connection parts 12A and 40 to pivot relative to each other, the first connection part 12A being arranged axially between a first end 62A of the shaft 60 and a first radial plane PA1 (parallel to directions X and Y that can be seen in particular in FIG. 3), while the second connection part 40 is arranged axially between said first radial plane PA1 and a second end 62B of the shaft 60. The shaft 60 is hollow and has an inside section that presents, at least in a first axial plane Q (shown in FIG. 1 and parallel to the directions Y and Z in this example), a first radial dimension DA over a first segment T1 of the shaft 60 extending axially between the first end 62A and the first radial plane PA1, which radial dimension DA varies, decreasing on axially approaching the first radial plane PA1. The assembly 1 has a first ring 20A (clearly visible in FIG. 4) that is interposed radially between the shaft 60 and the bore of the first connection part 12A, and that presents varying radial thickness E.

In this embodiment, the shaft 60 defines an axis (clearly visible in FIG. 1 and parallel to the direction Z shown in FIG. 3), about which the first and second connection parts 12A and 40 can pivot relative to each other, thereby performing the desired function of the pivot connection.

In this embodiment, the first and second connection parts 12A and 40 may pivot through 180° relative to each other in order to adopt the configuration shown in FIG. 3, and in this configuration they define the first axial plane Q.

In this embodiment, the axial direction is parallel to the direction Z, while a radial direction is perpendicular to the direction Z. Such a radial direction intersects the axis of the shaft 60.

In this embodiment, any plane that is said to be "axial" contains the axis of the shaft 60 and is thus parallel to the direction Z. In particular, in this embodiment, the first axial plane Q is parallel to the directions Y and Z. Under such circumstances, a radial direction lying in this first axial plane Q is necessarily parallel to the direction Y.

In this embodiment, any plane referred to as "radial" is perpendicular to the direction Z and is thus parallel to the directions X and Y.

In this embodiment, the assembly 1 is of the clevis/pin type. It comprises a clevis 10 incorporating the first connection part 12A and a third connection part 12B that is axially spaced apart from the first connection part 12A; together with a complementary part that incorporates the second connection part 40 and that is interposed axially between the first and third connection parts 12A and 12B of the clevis 10.

In this embodiment, the clevis 10 and the complementary part pivot relative to each other about the axis. During such pivoting, the first and third connection parts 12A and 12B are constrained to move together. They form a unit dissociated from the second connection part 40, this unit and this second connection part 40 being capable of pivoting relative to each other about the axis defined by the shaft 60.

In this embodiment, the second connection part 40 is arranged axially between the first radial plane PA1 and a second radial plane PB1, while the third connection part 12B is arranged axially between the second radial plane PB1 and the second end 62B of the shaft 60.

In this embodiment, the inside section of the shaft 60 presents a radial dimension DA1, DB1 that is constant, at least in the first axial plane Q and over a second segment T2 of the shaft 60 that is axially adjacent to the first segment T1, and that extends axially between the first radial plane PA1 and the second radial plane PB1.

In this embodiment, the inside section of the shaft 60 presents a radial dimension DB that varies in at least the first axial plane Q and over a third segment T3 of the shaft 60 that is axially adjacent to the second segment T2, and that extends axially between the second radial plane PB1 and the second end 62B of the shaft 60, the varying radial dimension DB decreasing on axially approaching the second radial plane PB1.

In this embodiment, the assembly 1 has a second ring 20B interposed radially between the shaft 60 and the bore of the third connection part 12B and presenting a radial thickness that varies.

In this embodiment, the inside section of the shaft 60 is circular, as can be seen clearly in FIGS. 1 and 2. Thus, over each of the first, second, and third segments T1, T2, and T3, the characteristic of the radial dimension of this inside section that applies in the first axial plane Q, applies likewise in any other axial plane, and in particular in a second axial plane orthogonal to the first axial plane Q (the second axial plane is parallel to the directions X and Z in FIG. 3). Under such circumstances, the radial dimension of the inside section corresponds to its diameter, as shown in FIG. 3.

In this embodiment, over the first segment T1, the radial dimension DA that varies decreases linearly on axially approaching the first radial plane PA1.

In this embodiment, over the third segment T3, the radial dimension DB that varies decreases linearly on axially approaching the second radial plane PB1.

In this embodiment, over the first segment T1, the radial dimension DA of the inside section presents a greatest value DA2 in the radial plane defined by the first end 62A, which plane intersects the axis of the shaft 60 at the point A3. Thereafter, still over the first segment T1, the radial dimension DA of the inside section decreases going axially away from the end 62A until it reaches a smallest value DA1 in a radial plane PA2 intersecting the axis of the shaft 60 at a point A2, which is at a distance from the point A3 and from a point A1 corresponding to the intersection between the first radial plane PA1 and the axis of the shaft 60. Thus, the radial plane PA2 is parallel to the first radial plane PA1, being axially set back therefrom beside the second end 62A of the shaft 60. Thereafter, still over the first segment T1, the radial dimension DA is constant and equal to its smallest value DA1 over the remaining portion of the first segment T1 lying between the radial plane PA2 and the first radial plane PA1.

In this embodiment, over the third segment T3, the radial dimension DB of the inside section presents a greatest value DB2 in the radial plane defined by the second end 62B, which plane intersects the axis of the shaft 60 at the point B3. Thereafter, still over the third segment T3, the radial dimension of the inside section decreases on going axially away from the second end 62B until reaching a smallest value DB1 in a radial plane PB2 intersecting the axis of the shaft 60 at a point B2, which is at a distance from the point B3 and from a point B1 corresponding to the intersection between the second radial plane PB1 and the axis of the shaft 60. Thus, the radial plane PB2 is parallel to the second radial plane PB1, being axially set back therefrom beside the second end 62B of the shaft 60. Thereafter, still over the third segment T3 the radial dimension DB is constant and equal to its smallest value DB1 over the remaining portion of the third segment T3 lying between the radial plane PB2 and the second radial plane PB1.

In this embodiment, the value DA1 is equal to the value DB1. Likewise, in this embodiment, the value DA2 is equal to the value DB2.

In this embodiment, over the second segment T2, the radial dimension of the inside section is constant. In particular, it is equal to the value DA1, which itself is equal to the value DB1 in this embodiment.

In this embodiment, given the fact that the inside section is circular, the inside surface of the shaft 60 presents symmetry of revolution about the axis of the shaft 60.

In this embodiment, this inside surface has a first frustoconical portion of axis coinciding with the axis of the shaft 60, with its large and small bases facing respectively towards the first end 62A of the shaft 60 and the first radial plane PA1. In particular, the large and small bases intersect the axis of the shaft 60 at the points A3 and A2 respectively. In particular, the diameters of the large and small bases are respectively equal to DA2 and DA1.

Similarly, in this embodiment, the inside surface has a second frustoconical portion of axis that coincides with the axis of the shaft 60 and having large and small bases facing respectively towards the second end 62B of the shaft 60 and the second radial plane PB1. In particular, the large and small bases intersect the axis of the shaft 60 at the points B3 and B2, respectively. In particular, the diameters of the large and small bases are equal respectively to DB2 and to DB1.

In this embodiment, the inside surface has a circularly cylindrical portion that is arranged between the first and second frustoconical portions, in continuity therewith. The axis of revolution of the cylindrical portion coincides with the axis of the shaft 60. In particular, in this embodiment, the diameter of this cylindrical portion is equal to DA1, which is itself equal to DB1, and vice versa.

In this embodiment, the first and third connection parts 12A and 12B are symmetrical to each other about a plane of symmetry P0 parallel to the first radial plane PA1, and the inside section of the shaft 60 is symmetrical about said plane of symmetry P0. In particular, this plane of symmetry P0 intersects the axis of the shaft 60 at a point O. The points A1 to A3 are respectively symmetrical with the points B1 to B3 relative to the point O. Likewise, the planes PA1 and PA2 are respectively symmetrical with the planes PB1 and PB2 relative to the plane P0.

In this embodiment, in order to enable other elements included in the assembly to be mounted on the shaft 60, the outline of the shaft 60 is somewhat asymmetrical at its ends 62A and 62B. In particular, the outline of the shaft 60 includes a shoulder 64A in the vicinity of one of its ends 62A, 62B (one or the other, e.g. the first end 62A), and a thread having screwed thereon a nut 70B in the vicinity of the other one of its two ends 62A and 62B. In this embodiment, the first, second, and third connection parts 12A, 40, and 12B are arranged axially one after another. In particular, they are confined axially between the shoulder 64A and the nut 70B, the first connection part 12A being confined axially between the shoulder 64A and the first radial plane PA1, while the second connection part 40 is confined axially between the first radial plane PA1 and the second radial plane PB1, and the third connection part 12B is confined axially between the second radial plane PB1 and the nut 70B.

Figure 4:
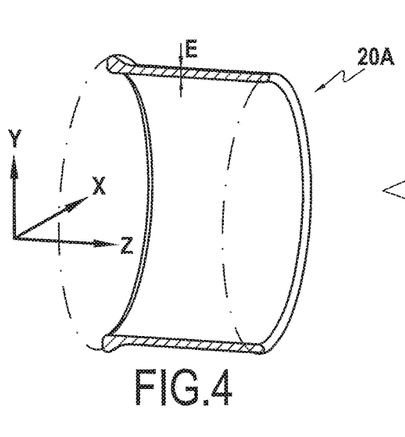
FIG. 4 is a perspective view partially in section showing a ring of this assembly.

In this embodiment, and as mentioned above, the first ring 20A is interposed radially between the shaft 60 and the bore of the first connection part 12A, and it presents radial thickness E that varies (see in particular FIG. 4).

In this embodiment, the first ring 20A presents symmetry of revolution, in particular about an axis of revolution that coincides with the axis of the shaft 60 when the first ring 20A is mounted on the shaft 60.

In this embodiment, the radial thickness E of the first ring 20A increases on axially approaching the first radial plane PA1, at least in the first axial plane Q (and in particular in all axial planes, given the fact that in this embodiment the first ring 20A presents symmetry of revolution as mentioned above).

In this embodiment, the radial thickness E is constant over a first portion of the first ring 20A that extends axially from the end of the first ring 20A that is to face the first end 62A of the shaft 60.

In this embodiment, the radial thickness E decreases over the remaining portion of the first ring 20A going axially away from the first radial plane PA1 so as to reach the constant value of the first portion, which extends the above-mentioned remaining portion.

In this embodiment, the first ring 20A presents an inside surface that is circularly cylindrical, such that the variation in the radial thickness E is obtained by the shape of the outside surface of the first ring 20A, which outside surface is a circular cylinder over its first portion and flares on approaching the first radial plane PA1 in the remaining portion of the first ring 20A. By way of example, this flare may be obtained by a surface that is frustoconical.

In this embodiment, and as mentioned above, the second ring 20B is interposed radially between the shaft 60 and the bore of the third connection part 12B, and it presents radial thickness that varies.

In this embodiment, the second ring 20B is analogous to the first ring 20A, which means that in the present disclosure it can comprise a selection of one or more of the characteristics that are described in detail above with reference to the first ring 20A and that are not described in detail again with reference to the second ring 20B for reasons of concision in the present disclosure. When the second ring 20B reproduces one or more of these characteristics, it suffices to adapt the terminology used, by analogy with and in the light of FIG. 3 in particular.

In this embodiment, the second ring 20B is identical to the first ring 20A, such that the second ring 20B reproduces all of the characteristics of the first ring 20A.

In this embodiment, in order to strengthen the resistance of the bores against the damage phenomena, the assembly 1 has a first pair of reinforcements 30A and 32A, each of which comprises an annular portion interposed radially between the shaft 60 and the first ring 20A, such that the first ring is itself interposed radially between these annular portions and the bore of the first connection part 12A. In this embodiment, each of the two annular portions of this first pair presents a radial thickness that is constant. In this embodiment, these two annular portions are arranged axially one beside the other. In this embodiment, each of the two reinforcements 30A and 32A of this first pair also includes a collar that extends parallel to the first radial plane PA1. In this embodiment, the respective collars of the two reinforcements 30A and 32A project radially in the vicinity of two axially opposite surfaces of the first connection part 12A. The collars can thus take up axial forces instead of and in the place of said opposing surfaces and/or can improve the axial setting of the first connection part 12A.

In this embodiment, the assembly 1 has a second pair of reinforcements 50A and 50B, each having an annular portion interposed radially between the shaft 60 and directly against the second connection part 40, and they are analogous to the reinforcements 30A and 32A of the first pair.

In this embodiment, the assembly 1 has a third pair of reinforcements 30B and 32B, each having an annular portion interposed radially between the shaft 60 and the second ring 20B, which is thus itself interposed radially between these annular portions and the bore of the second connection part 12B. In this embodiment, these reinforcements 30B and 32B are analogous to the reinforcements 30A and 30A, or indeed identical as shown in the figures.

In this embodiment, the clevis 10 (in particular the first and third connection parts 12A and 12B incorporated in the clevis 10) is made out of composite material, e.g. carbon/epoxy material. In this embodiment, the complementary part (in particular the second connection part 40 incorporated in the complementary part) is made of metal.

In this embodiment, the shaft 60 is made of metal.

In this embodiment, the first and second rings 20A and 20B are made of metal.

In this embodiment, the reinforcements 30A and 32A, and likewise the reinforcements 30B and 32B and the reinforcements 50A and 50B are made of metal.

Nevertheless, without going beyond the ambit of the present disclosure, it would be possible to use some other composition for a selection of one or more of the above-mentioned elements. By way of example, provision may be made for the complementary parts likewise to be made out of composite material and/or for the clevis 10 to be made out of metal.

Figure 5:
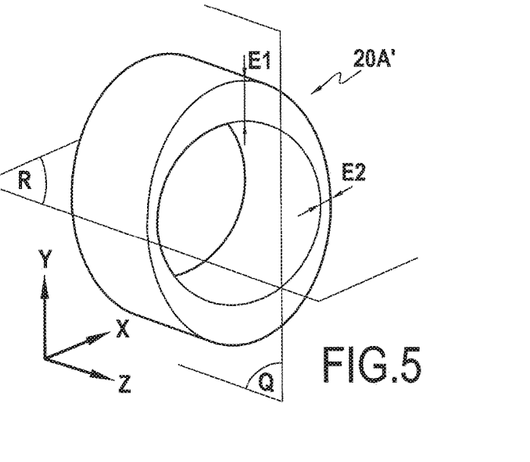
FIG. 5 is a perspective view of a ring of an assembly of a second embodiment in accordance with the present disclosure.
Figure 6:
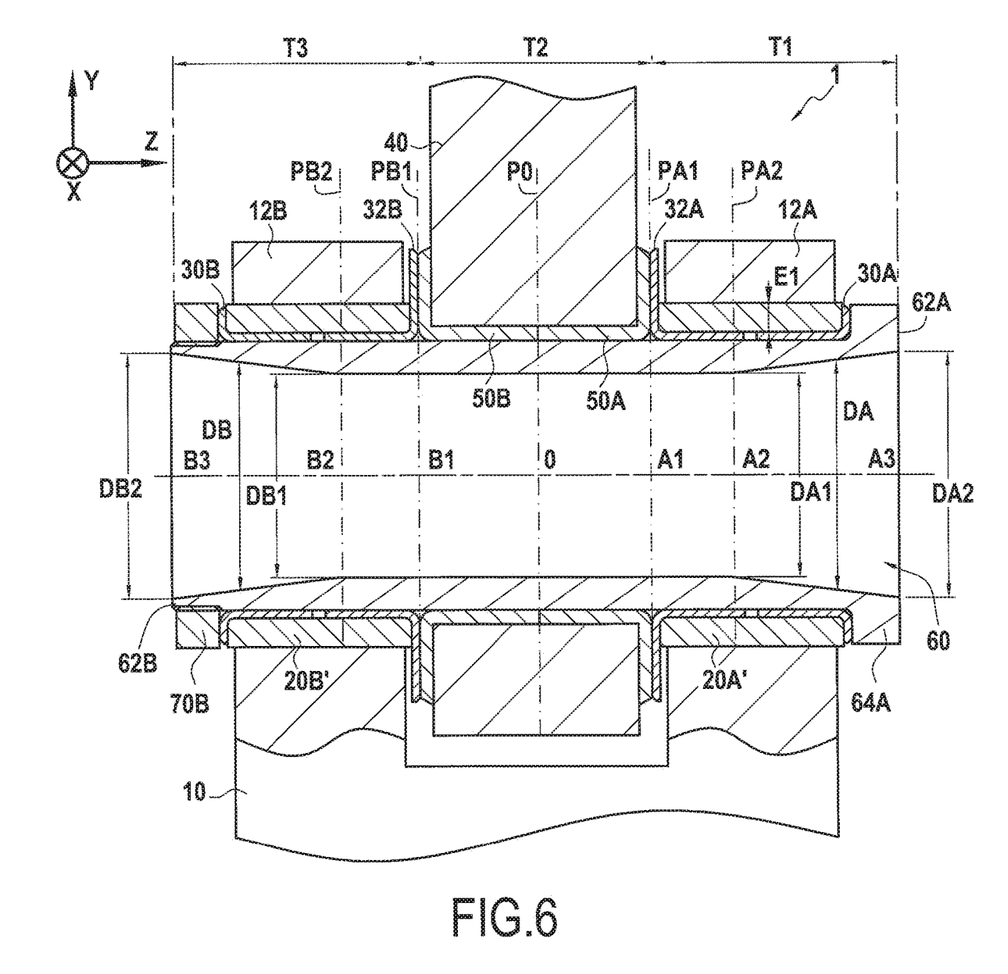
FIG. 6 is a view analogous to FIG. 3 showing the assembly of the second embodiment.

With reference to FIGS. 5 and 6, there follows a disclosure of a second embodiment of an assembly 1 of the pivot connection type in accordance with the present disclosure.

In this embodiment, all of the characteristics of the first embodiment as described above are reproduced, with the exception of characteristics relating to the first and second rings, which are modified in the second embodiment. Thus, for reasons of concision in the present disclosure, only these modified first and second rings 20A' and 20B' are described below. The other elements described with reference to the first embodiment are not described again with reference to the second embodiment, and they are given the same numerical references in FIG. 6.

In this second embodiment, the assembly 1 comprises a first ring 20A' (clearly visible in FIG. 5) that is interposed radially between the shaft 60 and the bore in the first connection part 12A, which ring presents a radial thickness E1, E2 that varies.

In this second embodiment, the radial thickness of the first ring 20A' is greater in the first axial plane Q than it is in a second axial plane R that is orthogonal to the first axial plane Q (in this embodiment, the second axial plane R is parallel to the directions X and Z). In particular, and as shown in FIG. 5, the radial thickness takes a maximum value E1 in the first axial plane Q and a minimum value E2 in the second axial plane R.

In this second embodiment, in a section plane parallel to the first radial plane PA1, the first ring 20A' presents an inside circumference that is circular and an outside circumference that is not circular. In particular, the outside circumference is elliptical, having its major axis in the first axial plane Q and its minor axis in the second axial plane R.

In this second embodiment, the assembly 1 has a second ring 20B' interposed radially between the shaft 60 and the bore of the third connection part 12B, which second ring presents radial thickness that varies.

In this second embodiment, the second ring 20B' is analogous to the first ring 20A', which means that in the present disclosure it may comprise a selection of one or more of the characteristics set out above with reference to the first ring 20A' and that are not described in detail again with reference to the second ring 20B', for reasons of concision in the present disclosure. When the second ring 20B' reproduces one or more of these characteristics, it suffices to adapt the terminology used by analogy with and in the light of FIG. 6, in particular.

In this second embodiment, the second ring 20B' is identical to the first ring 20A', such that the second ring 20B' reproduces all of the characteristics of the first ring 20A'.

The embodiments described in the present disclosure are given by way of non-limiting illustration, and in the light of this disclosure, a person skilled in the art can easily modify these embodiments or envisage others, while remaining within the ambit of the invention.

Furthermore, the various characteristics of these embodiments may be used singly or in combination with one another. When they are combined, the characteristics may be combined as described above or in other ways, the invention not being limited to the specific combinations described in the present disclosure. In particular, unless specified to the contrary, a characteristic described with reference to any one embodiment may be applied in analogous manner to any other embodiment.

We claim:

1. A pivot connection type assembly comprising a shaft and first and second connection parts that are dissociated from each other, each having a bore receiving the shaft so as to enable the first and second connection parts to pivot relative to each other, the first connection part being arranged axially between a first end of the shaft and a radial plane, while the second connection part is arranged axially between said radial plane and the other end of the shaft, the assembly being characterized in that the shaft is hollow and includes an inside section that presents a radial dimension at least in a first axial plane and over a first segment of the shaft extending axially between the first end and the radial plane, which radial dimension varies, decreasing on axially approaching the radial plane, and in that the assembly includes a ring interposed radially between the shaft and the bore of the first connection part, and presenting a radial thickness that varies and an elliptical cross-section, wherein the radial thickness of the ring is greater in the first axial plane than in a second axial plane orthogonal to the first axial plane.

2. An assembly according to claim 1, wherein the radial dimension that varies decreases linearly on axially approaching the radial plane.

3. An assembly according to claim 1, wherein the inside section of the shaft presents a radial dimension that is constant in said at least one first axial plane and over a second segment of the shaft that is axially adjacent to the first segment.

4. An assembly according to claim 1, wherein the inside section of the shaft is circular.

5. An assembly according to claim 1, wherein the ring presents symmetry of revolution.

6. An assembly according to claim 1, including a clevis incorporating the first connection part and a third connection part spaced apart axially from the first connection part, and a complementary part incorporating the second connection part and interposed axially between the first and third connection parts of the clevis.

7. An assembly according to claim 6, wherein the first and third connection parts are symmetrical to each other about a plane of symmetry parallel to the radial plane, and wherein the inside section of the shaft is symmetrical relative to said plane of symmetry.

8. The assembly of claim 1, wherein a major axis of the elliptical cross-section of the ring is in the first axial plane, and a minor axis of the elliptical cross-section of the ring is in the second axial plane.

9. A pivot connection type assembly comprising a shaft and first and second connection parts that are dissociated from each other, each having a bore receiving the shaft so as to enable the first and second connection parts to pivot relative to each other, the first connection part being arranged axially between a first end of the shaft and a radial plane, while the second connection part is arranged axially between said radial plane and the other end of the shaft, the assembly being characterized in that the shaft is hollow and includes an inside section that presents a radial dimension at least in a first axial plane and over a first segment of the shaft extending axially between the first end and the radial plane, which radial dimension varies, decreasing on axially approaching the radial plane, and in that the assembly includes a ring interposed radially between the shaft and the bore of the first connection part, and presenting an elliptical cross-section and a radial thickness that varies such that the radial thickness of the ring is greater in the first axial plane than in a second axial plane orthogonal to the first axial plane.

10. An assembly according to claim 9, wherein the radial dimension that varies decreases linearly on axially approaching the radial plane.

11. An assembly according to claim 9, wherein the ring has a closed cross-section.

12. An assembly according to claim 9, wherein a major axis of the elliptical cross-section of the ring is in the first axial plane, and a minor axis of the elliptical cross-section of the ring is in the second axial plane.

* * * * *